United States Patent
Schoenlaub

[15] 3,667,294
[45] June 6, 1972

[54] APPARATUS FOR THERMAL ANALYSIS

[72] Inventor: Robert A. Schoenlaub, Columbus, Ohio
[73] Assignee: The Edward Orton, Jr. Ceramic Foundation, Columbus, Ohio
[22] Filed: July 23, 1969
[21] Appl. No.: 844,031

[52] U.S. Cl. ....................................................73/190 R
[51] Int. Cl. ......................................................G01k 17/00
[58] Field of Search.............................................73/15, 190

[56] References Cited

UNITED STATES PATENTS

| | | | |
|---|---|---|---|
| 3,266,307 | 8/1966 | Winter | 73/190 |
| 3,267,728 | 8/1966 | Solomons | 73/190 |
| 3,319,456 | 5/1967 | Speros et al. | 73/15 |
| 3,373,607 | 3/1968 | Schoenlaub | 73/190 |
| 3,417,604 | 12/1968 | Bean et al. | 73/15 |

OTHER PUBLICATIONS

Smith, " A Sample Method of Thermal Analysis Permitting Quantitative Measurements of Specific and Latent Heats" in Transactions of the American Institute of Mining & Metallurgical Engineers, Vol. 137, 1940, TNI A53, pp. 236–245.

*Primary Examiner*—Richard C. Queisser
*Assistant Examiner*—Herbert Goldstein
*Attorney*—Francis T. Kremblas, Jr.

[57] ABSTRACT

A method and apparatus for high measurement of heat content which includes an electric furnace in which a sample holding container of predetermined dimensions is placed. A pair of differentially connected thermocouples are disposed such that one measures the temperature of the container walls as a reference and the other the temperature of the sample. A source of bias voltage is used to cause the hot junction of the reference thermocouple to be maintained at a given temperature differential above the other thermocouple. A control system is operatively connected to the thermocouples and to the power source of the furnace to vary the amount of heat delivered to the container responsive to maintaining the predetermined temperature differential between the thermocouples as established by the bias voltage. The temperature of the sample is then recorded versis the time required for the temperature of the sample to reach the upper limit of the temperature range of the test run.

6 Claims, 4 Drawing Figures

Fig. 1.

INVENTOR.
ROBERT A. SCHOENLAUE
BY
Francis J Kremblas Jr.
ATTORNEY

APPARATUS FOR THERMAL ANALYSIS

The present invention relates generally to testing apparatus and particularly to improved apparatus and method for high temperature thermal analysis particularly suitable for the analysis of ceramic and metallurgical materials.

Prior to the present invention measurements of heat content have been conducted with apparatus adapted to two different well-known methods, the drop method or by differential thermal analysis.

The drop method has the advantage of being quite precise but it has the disadvantage of being a static procedure which requires a large multitude of determinations for complete information of any one material. Further small enthalpy differences must be determined by subtraction of large closely spaced quantities which decreases accuracy. These disadvantages render this procedure impractical.

More frequently used is differential thermal analysis which comprises heating a known and unknown sample at a rapid and constant rate under identical circumstances. Any difference in temperature, as measured from differential thermocouples in the two samples is recorded against temperatures.

Although this procedure has the advantages of speed and simplicity, it leaves much to be desired due to many disadvantages. For example, the fast rate of heating that is necessary is not well suited for ceramic materials or other materials which have sluggish reactions as extensive overruns occur. Further, large reactions tend to blanket or hide small reactions. Also amplifications required for small enthalpies give erratic signals which limit the degree of sensitivity to less than that which is desirable. The results obtained are not as closely reproducible as desired nor are they quantitative or strictly comparable with other measurements which require time for their completion.

Many other efforts have been made to attempt to improve the precision and accuracy of thermal analysis in this area but these efforts have either failed to produce the desired results and/or have been too complex and expensive to be used in a practical manner in the ceramic or metallurgical industries.

In general, the apparatus for thermal analysis of the present invention comprises a sample container of predetermined dimensions and composed of a predetermined material, generally a refractory material. A pair of thermocouples connected to one another in opposing relationship are employed in a unique manner. One thermocouple functions as a reference and is disposed in a manner to measure the temperature of the wall of the sample container and the other is disposed in the sample to measure its temperature. A source of bias voltage is employed to cause the hot junction of the reference thermocouple to be maintained at a given temperature differential above the other thermocouple measuring the temperature of the sample. Control means are operatively connected to the thermocouples and to the power source of the furnace in which the sample container is placed to vary the amount of heat delivered to the walls of the container responsive to maintaining the predetermined temperature difference between the thermocouples. Recording means are connected to the thermocouple in the sample to record the sample temperature versus the time required to traverse a predetermined temperature range.

It is therefore a primary object of the present invention to provide an apparatus and method for thermal analysis which retains most of the advantages of prior methods and means but also eliminates most of the aforementioned disadvantages.

More specifically it is another object of the present invention to provide an apparatus and method of the type described which gives reproducible data which can be of practical usefulness to aid in ceramic and metallurgical design.

It is another object of the present invention to provide an apparatus and method of the type described which does not limit the time required during a test for reactions in the sample to be completed.

It is another object of the present invention to provide an apparatus and method of the type described which produces data which can be relatively easily converted to heat content information and therefore closely approaches dynamic calorimetry.

It is still another object of the present invention to provide an apparatus and method of the type described which is capable of high temperature operation with far greater sensitivity than any other prior methods and means.

It is still a further object of the present invention to provide an apparatus of the type described which employs relatively simple instrumentation and which may be manufactured and fabricated at relatively low cost.

Further objects and advantages of the present invention will be apparent from the following description, reference being had to the accompanying drawings where in preferred form of embodiment of the invention is clearly shown.

In the drawings

Figures 1, 2:
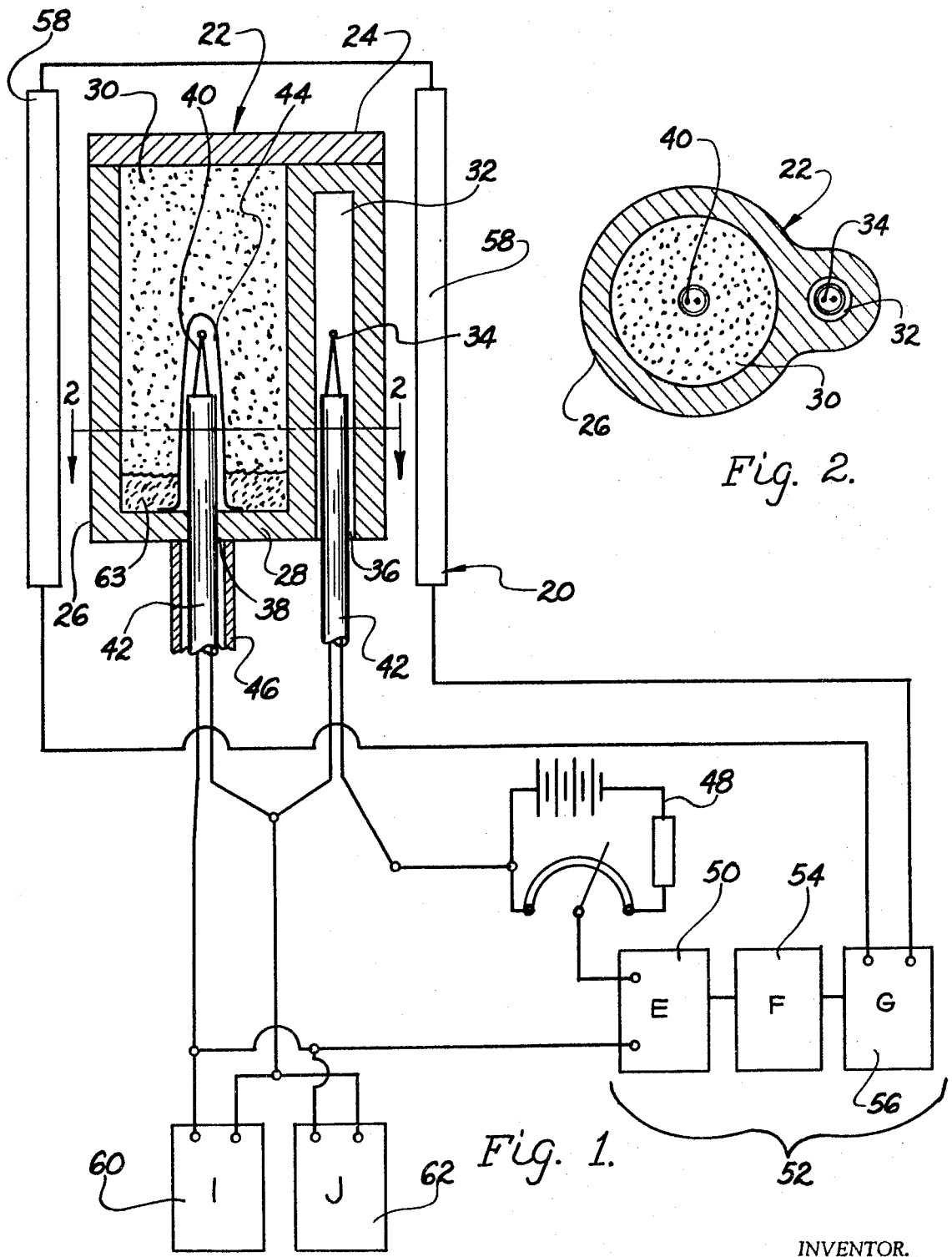
FIG. 1 is a diagrammatic view of an apparatus constructed in accordance with the present invention and includes a side sectional view of a sample container and associated parts forming a portion of the apparatus.
FIG. 2 is a top sectional view of the sample holder and associated parts forming a portion of the apparatus shown in FIG. 1.

Referring in detail to FIGS. 1 and 2, an apparatus for thermal analysis constructed in accordance with the present invention is indicated generally at 20 and includes a sample container means indicated generally at 22.

Container means 22 includes a removable top 24, cylindrical side walls 26 and a bottom wall 28 which form a chamber for receiving a sample 30 of the material to be tested.

A well 32 is provided in side walls 26 to receive a reference thermocouple 34 through an opening 36 in bottom wall 28 and is designed so that thermocouple 34 is maintained at or very close to the temperature of the walls of container means 22.

A second opening 38 in bottom wall 28 is provided to accommodate a measuring thermocouple 40 which extends into the chamber and substantially into the center of the sample 30.

Insulators 42 are provided around each thermocouple and a shield 44 of platium, nickel or other suitable material is preferably provided around the portion of thermocouple 40 in the sample chamber to protect it should the sample material sinter, or melt which might freeze the thermocouple.

A support 46 is provided for the lower portion of the thermocouple 40 which is outside container means 22.

Thermocouples 34 and 40 are connected in opposing or differential relationship to one another. Reference thermocouple 40 also is connected to a source of a variable drive or bias voltage 48. Preferably this source of bias voltage can be a zener diode capable of producing very stable voltages and in conjunction with resistors very accurate voltages in the range of 0 to 100 microvolts can be obtained.

The bias voltage is added to the differential signal from the opposed thermocouples 34 and 40. This, in effect, creates an error signal which is fed to a very sensitive microvolt amplifier 50 which froms a portion of a control means indicated generally at 52.

Preferably, control means 52 also includes a conventional, proportional control system 54 and a silicon controlled rectifier 56 which is connected to a conventional electric furnace's heating elements 58.

Thermocouple 40 is connected to a conventional strip chart recorder 60. When higher accuracy or sensitivity is desired, recorder 60 may be supplemented by a millivolt recorder or precision potentiometer 62.

It should be pointed out that preferably this is a potentiometer system with balanced signals and high impedance in all connected elements to permit errors from being introduced into the control system 54 or into recorders 60 and 62.

It should be pointed out that the type of thermocouples effect the electrical components and the rate of heating of the sample. For example, if chromel-alumel couples are used, about 40 microvolts per degree centigrade are obtained which eases the load on the electrical components. However, such thermocouples lack stability and therefore are less desirable than noble metal couples which give about 7 microvolts per degree centigrade at low temperatures and about 10 microvolts per degree centigrade at high temperatures. The signals developed by noble metal thermocouples are thus weaker and vary more with temperature but they are much more stable than base metal thermocouples.

It should also be pointed that the size of the sample chamber and the material used for the holder can be varied without departing from the spirit of the present invention. However, to obtain good results, some limitations in form and in the material must be observed.

For example, the distance between the inside surfaces of the container walls and the measuring thermocouple 40 should be about 0.5 centimeters or greater for reliable, reproducible results. This requires larger samples to be used compared to prior art methods such as differential thermal analysis where the tendency has been toward smaller samples weighing less than 100 milligrams to sharpen the test data. In contrast, the samples preferably used in the present invention weigh at least one gram and preferably more.

If the distance between the walls and the measuring thermocouples 40, which is generally disposed in the center of the sample becomes smaller than about 0.5 centimeters, the results obtained are not as reproducible.

For reproducible results, the temperature of the walls of the container means must be substantially uniform.

Lateral temperature uniformity, suitable for the purposes of the apparatus, can be obtained by the use of materials with good thermal conductivity and constructing the container walls of appreciable thickness to overcome practical deficiencies of the furnace in which the container means is placed. Most furnaces develop hot spots with age or the container means may not be placed directly in the center of the furnace such that both sides are heated at equal rates.

Since the transfer of heat by conduction is directly proportional to the area of the conducting path, it is desirable to maintain the thickness of the walls of the container means within suitable limits.

The preferred minimum thickness of the walls of container means 22 is about 0.15 centimeters and the optimum thickness is about 0.30 centimeters. However, as the thickness and mass becomes larger, the tendency to obtain a lag during exothermic reactions in the sample becomes greater, therefore it can be readily understood that there are practical limitations as to the dimensions employed.

Further if the thermal conductivity of the material from which the container means is made falls below 0.01 cal/cm²/c m/C /sec. uniformity in the temperature of the container means becomes extremely difficult to obtain.

Since thermal conductivity and wall thickness are related, the preferred minimum characteristics of the container means may be expressed as the product of the wall thickness and the thermal conductivity of the material used and preferably should be at least 0.0015 or greater when conductivity is expressed as cal/cm²/cm/ C times the thickness of the container wall in centimeters. Therefore depending upon the thermal conductivity of the material used, the wall thickness of any one container means preferably varies between the limits of about 0.15 cm to about 0.5 cm.

In addition, there is also a relationship between the height of the container means 22 and the inside diameter that should be maintained if the most desirable condition of a lateral heat flow inward to the sample is to be obtained. It has been found that the height should be about 1½ times the inside diameter to obtain optimum heat flow.

It should also be understood from the foregoing description that the sample must receive substantially all heat by conduction if useful reproducible data is to be obtained. The rates of heat transfer by radiation depend upon so many factors which are difficult to control that results can not be reproduced.

In operation, the sample material 30 is placed in the chamber of container means 22 and the container means is positioned in an electric furnace with the thermocouples positioned as shown in FIG. 1.

The source of bias voltage is adjusted to a predetermined value which sets the rate of the test run, such as 60 microvolts for example. The bias voltage causes the hot junction of reference thermocouple 34 to be maintained above the hot junction of measuring thermocouple 40 so that a predetermined differential exists between thermocouples 34 and 40.

As the temperature of the walls of container means 22 rises, the heat conducted therefrom to the sample causes its temperature to rise. The temperature differential between the thermocouples 34 and 40 is maintained by control means 52 which controls the amount of heat delivered by the furnace. In this manner, very accurate control of the temperature of the walls of container means 22 is maintained so that a measured rate of heat flows by conduction from the walls of container means 22 to the sample.

Simultaneously, the temperature at the center of the sample is continuously recorded versus time by recorder 60. Any reactions occurring over the range of the test run can be readily observed from a study of the graphs obtained from the recorder.

Figure 3:
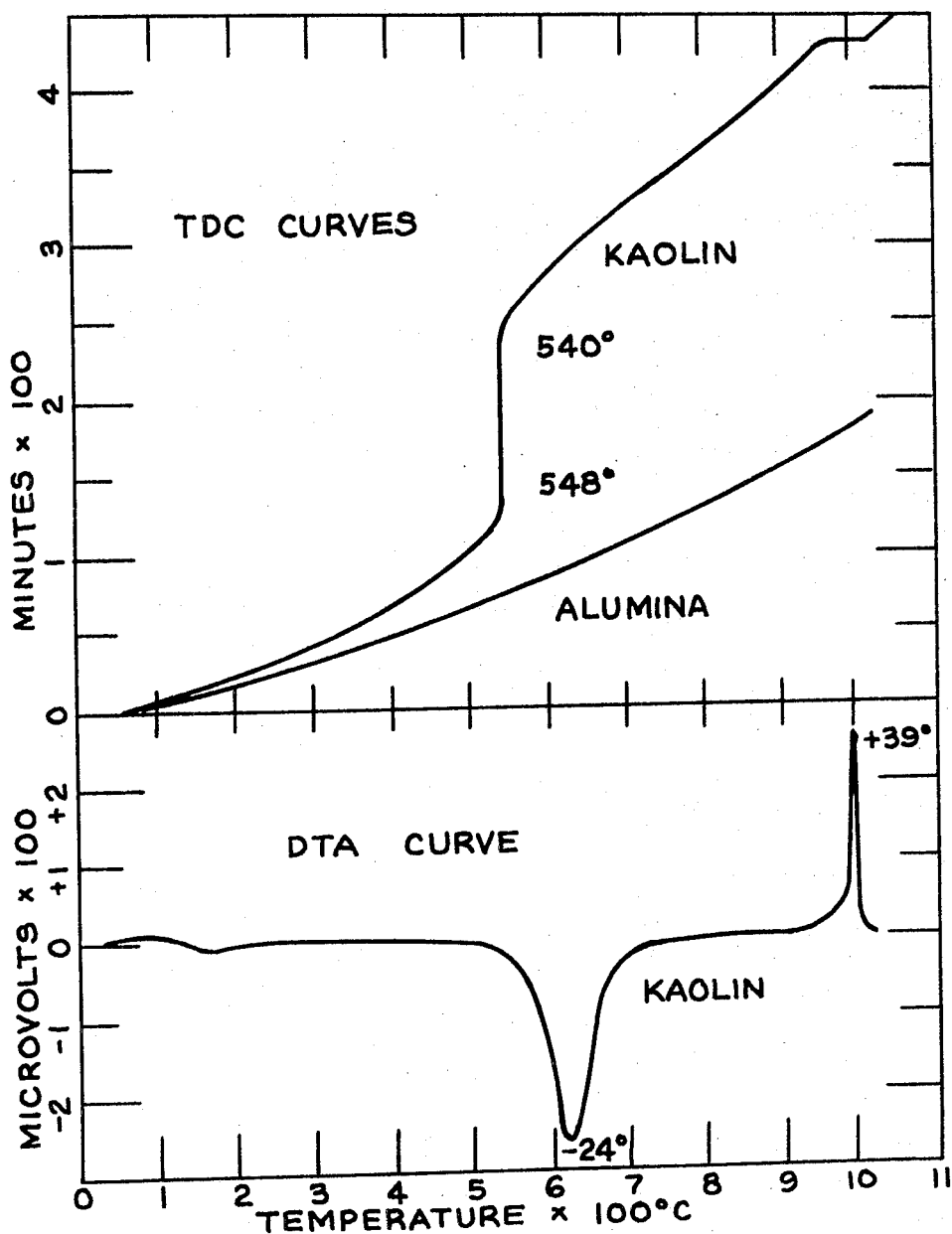
FIGS. 3 and 4 are diagrammatic views of graphs illustrating data obtained from the apparatus of the present invention as compared to data obtained by a prior apparatus.
Figure 4:
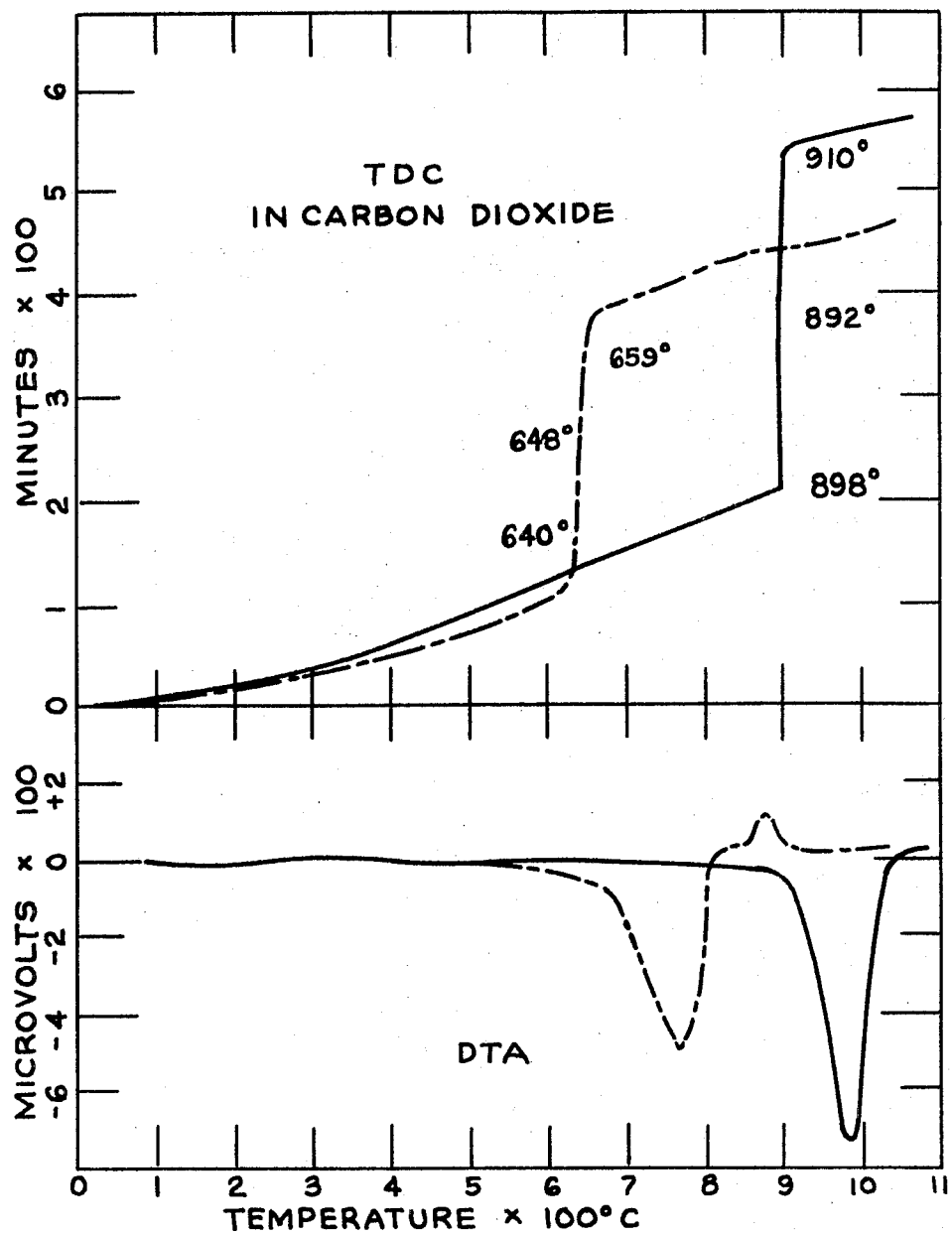

Typical graphs obtained from the analysis of certain materials using the apparatus of the present invention are illustrated in the upper portions of FIGS. 3 and 4. For comparison purposes, the lower portions of FIGS. 3 and 4 illustrate typical graphs obtained by conventional differential thermal analysis.

A study of the curves readily indicates the valuable knowledge obtainable with the apparatus of the present invention as compared to the differential thermal analysis curves. For example, FIG. 3 shows that contrary to the prior literature on the subject, Florida Kaolin loses hydroxyl water between 540° and 548° C. rather than 550° to 700° C. Centigrade as previously indicated for ceramic materials by differential thermal analysis. Tests run with other types of Kaolins show the same results and therefore indicate that this must be a characteristic of the mineral Kaolinite.

Alumina has no thermal reactions so the differential thermal analysis curve, not shown, is smooth.

In FIG. 4 the curves for calcium carbonate, indicated by the solid line, and magnesium carbonate, indicated by the broken line, may be compared.

These curves show that calcium carbonate decomposes between 898° and 910° C. and magnesium carbonate decomposes between 640° and 659° C. The lower curves which are the standard differential thermal analysis curves in no way indicate as precisely this information.

To obtain optimum results, the electrical components of the temperature control system should be precise. and reliable, however, such components are well-known and readily available commercially.

Amplifier 50 preferably should have ranges below 50 millivolts. Usually the controls operate well on a range of 10 microvolts.

Thermocouples 34 and 40 should be constructed of reference grade wire and in practice cause little trouble below 1000 degrees centigrade. Above this temperature most failures that may occur result from freezing or inadvertent mechanical damage. For this reason it may be desirable to use a refractory metal shield 44, such as platinum or nickel, with a bottom seal 63 of alumina or nitrous silica.

Control system 54 is of the conventional three mode proportional type and control element 56 consists usually of a conventional silicon controlled rectifier.

It has been found that with conventional electrical components as described above, the temperature of the walls of container means 22 may be controlled over a range of about 1 microvolt. The amplifier 50 is usually set on a range of plus or minus 10 microvolts and the control means as a whole give a total amplification of from plus or minus 0.5 microvolts to zero to 100 volts.

From the foregoing description, it can be readily understood that the precise control of the temperature of the walls of the container means permit one to readily measure the rate of conducted heat to the sample within. It should also be pointed out that the sensitivity can be greatly increased by decreasing the value of the bias voltage from source 48. However, this gives low temperature differentials between thermocouples 34 and 40 and requires long test periods.

For example, the drying characteristics of sensitive clays may be investigated with bias voltages of 10 millivolts or less.

Similarly, inversions of ceramic materials may also be investigated at this low value of bias voltage. The temperature is thereby made to slowly traverse an inversion point. If the specific heat of the sample material is known, the rate of heat input can be calculated, which in turn will indicate the heat of inversion by simple calculation.

In addition, the method and apparatus of the present invention permit the investigation of gas solid reactions which is especially useful for ceramic materials which contain combustible material. To accomplish this, the temperature is raised to the reaction temperature with the sample in an inert atmosphere. The gas is then changed, and the charge in temperature is recorded.

The method and apparatus of the present invention is also useful in measuring heat content of materials since obviously the curves indicate an absorption or release of heat by a material. The rate of this heat transfer depends upon many factors which are so variable that each material must be individually calibrated. This may be easily done using a dropping calorimeter with about four determination. For each material this will give a heat constant at different temperatures from which a heat content versus temperature curve can be calculated.

While the form of embodiment of the present invention as herein disclosed constitutes a preferred form, it is to be understood that other forms might be adopted, all coming within the scope of the claims which follow.

I claim:

1. An apparatus for thermal analysis comprising, in combination, furnace means of relatively high thermal conductivity; a container means disposed within said furnace means for holding a sample to be analyzed; a pair of thermocouples connected to one another in opposing relationship, the first of said pair for measuring the temperature of said container means and the second of said pair disposed within said container for measuring the temperature of a sample disposed therein; a source of bias voltage operatively connected to said thermocouples to produce a voltage signal representing a temperature differential between said thermocouples; control means operatively connected to said source of bias voltage, to said thermocouples and to said furnace means to control the heat delivered by said furnace means to said container means responsive to maintaining said container means at a temperature differential above the temperature of said sample according to the magnitude of said signal produced by said source of bias voltage; and recording means operatively connected to said second thermocouple for recording the temperature of the sample in said chamber versus the time required to heat the sample through a predetermined temperature range.

2. The apparatus defined in claim 1 wherein said container means is composed of a material having a thermal conductivity constant of at east 0.01 cal/cm$^2$/cm/ °C/ sec and a wall thickness of at least 0.15 cm.

3. The apparatus defined in claim 1 wherein said thermocouple for measuring the temperature of said sample is disposed within said container means at a distance of at least 0.5 cm from the inside surfaces of said container means.

4. An apparatus for thermal analysis of materials comprising, in combination, furnace means of a relatively high thermal conductivity; a container means disposed within said furnace means and including top, bottom and side walls for receiving the sample to be tested; a pair of thermocouples connected to one another in opposing relationship, the first of said pair for measuring the temperature of said walls of said container and the second of said pair disposed in said container means for measuring the temperature of a sample contained therein; a source of bias voltage operatively connected to said thermocouples to establish a voltage signal representing a predetermined temperature differential between said thermocouples; control means operatively connected to said source of bias voltage, to said thermocouples and to said furnace means to control the heat delivered by said furnace means to the walls of said container means responsive to maintaining said predetermined temperature differential between said thermocouples; and recording means operatively connected to said second thermocouple for recording the temperature of a sample in said container means versus the time required to heat the sample through said predetermined temperature range.

5. The apparatus defined in claim 4 wherein said container means is composed of a material having a thermal conductivity constant of at least 0.01 cal/cm$^2$/cm/ °C/ sec and the walls of said container means have a thickness of at least 0.15 cm.

6. A method of thermal analysis of a material comprising the steps of placing a sample of the material to be analyzed in heat conduction relationship within container composed of heat conducting material of relatively high thermal conductivity; heating the container to cause heat to be conducted to the sample; controlling the temperature of the container responsive to maintaining a predetermined temperature differential between the container and the sample; and recording the temperature of the sample versus the time required to heat the sample through a predetermined temperature range.

* * * * *